INVENTOR
WILLIAM H. SCHWARTZ

BY
Oberlin, Maky, Donnelly & Renner
ATTORNEYS

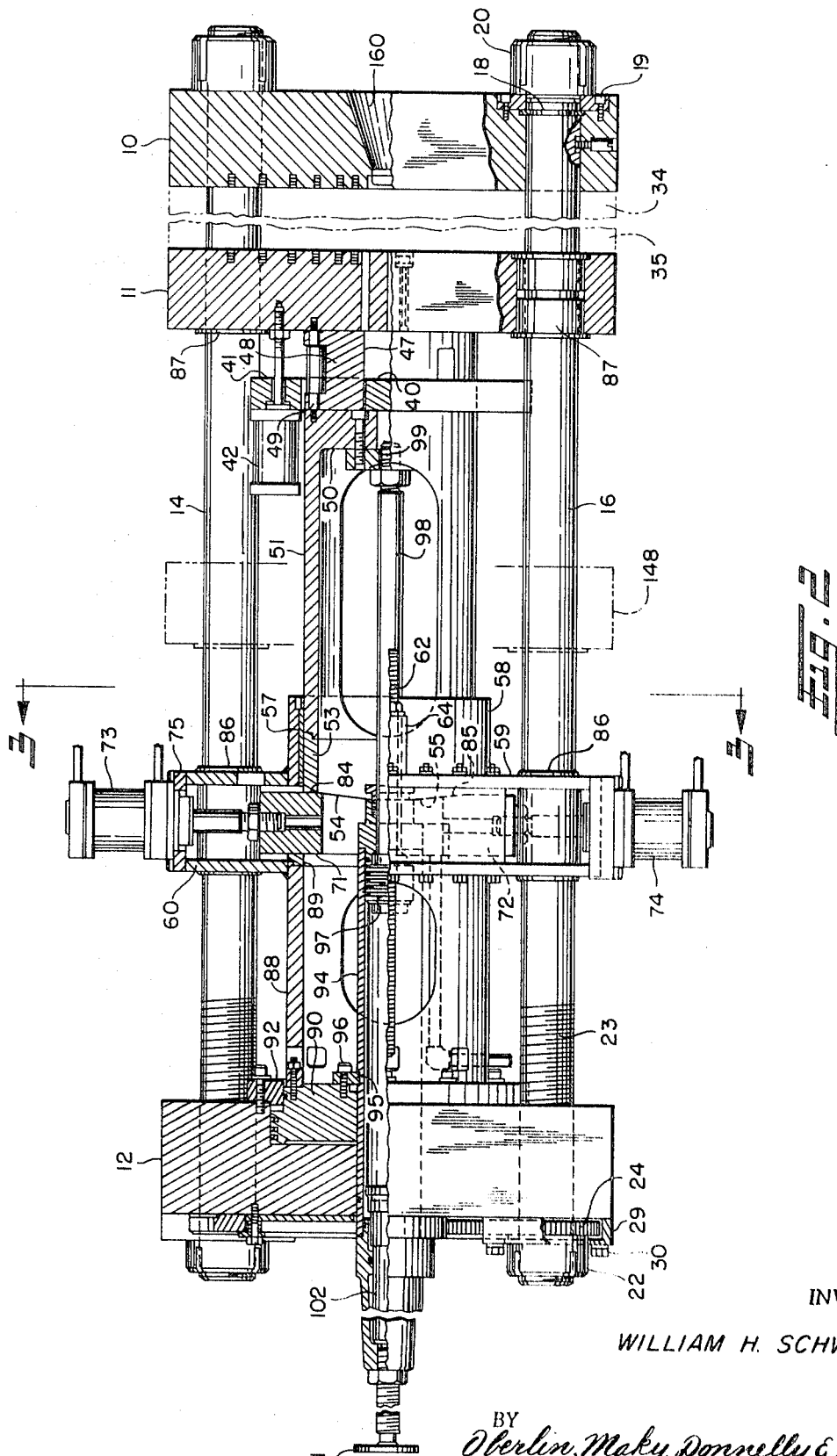

June 29, 1971 W. H. SCHWARTZ 3,588,957
INJECTION MOLDING MACHINE

Filed Dec. 5, 1968 4 Sheets-Sheet 3

INVENTOR
WILLIAM H. SCHWARTZ

BY Oberlin, Maky, Donnelly & Renner
ATTORNEYS

INVENTOR
WILLIAM H. SCHWARTZ

United States Patent Office 3,588,957
Patented June 29, 1971

3,588,957
INJECTION MOLDING MACHINE
William H. Schwartz, University Heights, Ohio, assignor to Lester Engineering Company, Cleveland, Ohio
Filed Dec. 5, 1968, Ser. No. 781,552
Int. Cl. A22c 9/00
U.S. Cl. 18—30LA                                    11 Claims

ABSTRACT OF THE DISCLOSURE

An injection molding machine using a large clamp piston-cylinder assembly connected to the movable platen through a solid column formed by telescoping cylinders interconnected by shear blocks when the movable platen has been closed to obtain the desired clamping tonnage.

---

This disclosure relates generally as indicated to an injection molding machine and more particularly to a machine such as an injection molding machine or die casting machine having a fast acting high pressure clamp which will quickly obtain the desired clamping tonnage on the separable molds or dies.

Hydraulic clamps for injection molding machines generally require complex hydraulic controls particularly to achieve high speed operation. Hydraulic systems in such machines are complex and require high pressure lines and components as well as substantial amounts of hydraulic fluid under pressure. Such hydraulic clamps usually have limited life and durability and adjustment of the stroke or mold height is difficult.

It is accordingly a principal object of this invention to provide a machine having a stable reliable clamp.

Another principal object is the provision of such machine having a high speed clamp operation utilizing a simplified hydraulic system.

A further object is the provision of a machine and clamp therefor having maximum stroke and mold height but with a readily adjustable stroke for shallower molds.

Another object is the provision of a machine utilizing telescoping steel tubes connected to a large diameter piston built into the solid steel end plate to obtain increased life and durability.

Yet another object is the provision of a machine having an inner cylinder connected to the moving platen which drives forward at full speed to close the platens and at the end of the closing stroke, shear blocks or wedges mechanically connect the inner cylinder with the outer cylinder to form a continuous solid column.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In said annexed drawings:

FIG. 2 is a side elevation, also partially broken away and in section, with the movable platen illustrated in the "open" position in phantom lines;

Figure 1:
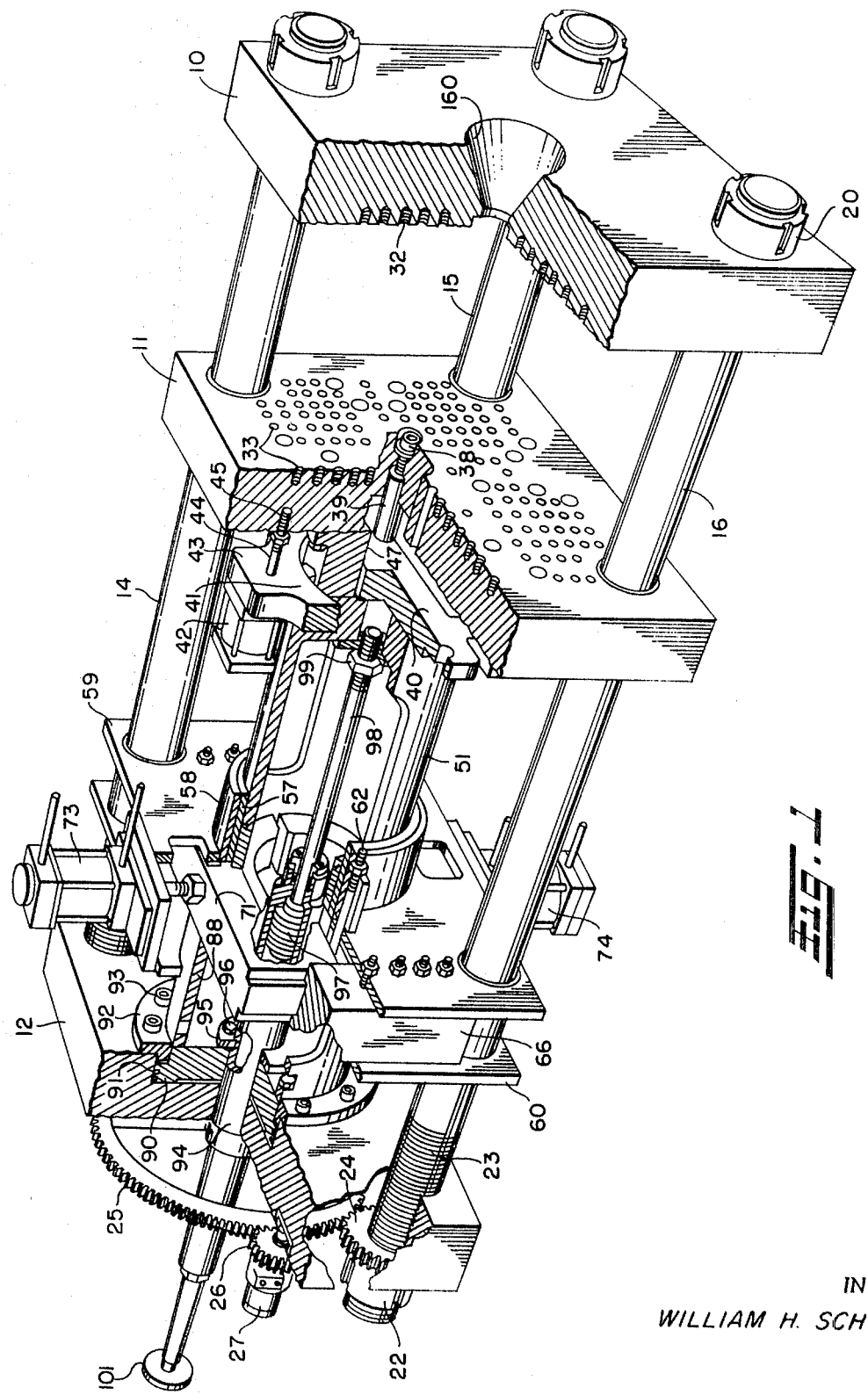
FIG. 1 is a perspective view of a machine in accordance with the present invention partially broken away and in section.

Referring first to FIGS. 1 and 2, it will be seen that the machine includes a fixed die plate or platen 10, a movable platen 11 and an end plate 12. Tie rods 13, 14, 15 and 16, seen perhaps more clearly in FIG. 3, extend from the fixed die platen 10 through the movable die platen 11 and through the fixed end plate 12.

As seen in FIG. 2, the tie rods are provided with a lock washer as indicated at 18 secured between a shoulder in the fixed die platen 10 and retaining ring 19. Large nuts 20 are then threaded to the ends of the tie rods securing the tie rods to the fixed platen 10.

The rods pass through end plate 12 and are provided with nuts 22 threaded thereon, the extent of threading of such rods at this end thereof being substantial as indicated at 23. Such nuts 22 are formed integrally with pinions 24 which are in mesh with ring gear 25. The ring gear is driven from pinion 26 in turn driven by hydraulic motor 27.

As seen more clearly in FIG. 2, the pinions 24 of the nuts 22 are enclosed in housings 29 secured by suitable fasteners 30 to the outer face of the end plate 12. The hydraulic motor 27 is reversible and is used to control the die height adjustment by spacing the end plate 12 from the fixed die platen 10 to the desired extent.

Both the fixed and movable die platens 10 and 11 are provided with tapped apertures indicated generally at 32 and 33, respectively, which facilitate the securing to the opposed interior faces thereof separable mold halves or dies indicated schematically at 34 and 35 in FIG. 2.

An ejector mechanism in the die or mold half 35 secured to the movable die platen 11 is secured to adapter 38 on the end of ejector rod 39 secured to diametral portion 40 of ejector ring 41. The ring may be actuated by piston-cylinder assemblies 42 secured to radial projections 43 on such ring with the rods 44 passing through such projections and secured as indicated at 45 to the movable die platen 11. When the piston-cylinder assemblies 42 are retracted, the ring moves toward the movable die platen and the rod 39 extends actuating the ejector mechanism.

The diametral portion 40 of the ejector ring extends through a slot 47 in yoke or spacer 48 which is secured by the fasteners 49 both to the movable die platen 11 and the end wall 50 of cylinder 51. The opposite end of the cylinder 51 is provided with a wear resistant end cap 53, the end face of which includes two slight wedge angles 54 and 55 diametrically opposite each other.

The cylinder 51 extends within bushing 57 secured within cylinder 58 projection axially from plate 59. The plate 59 is connected to parallel plate 60 by two relatively large fasteners 62 and 63 which also extend through bosses 64 and 65 on the sides of the cylinder or collar 58. The plates are also connected together through spacer blocks 66 and 67 with a plurality of fasteners seen at 68 holding the parts assembled as seen more clearly in FIGS. 3 and 4. The interior of each of the spacer blocks is provided with a vertically extending way or groove 69 in which fit the laterally projecting tongues 70 of wedges 71 and 72.

The wedges 71 and 72 are operated by piston-cylinder assemblies 73 and 74, respectively. The piston-cylinder assembly 73 is mounted on plate 75 bridging the top of the plates 59 and 60. The rod 76 of the assembly 73 is connected at 77 to the top of the wedge 71. The piston-cylinder assembly 74 is supported on plate 78 bridging the bottom of the plates 59 and 60 and the rod 79 thereof is connected at 80 to the bottom of the wedge 72. These double-acting piston-cylinder assemblies extend and retract simultaneously to place the wedges 71 and 72 in operative or inoperative position.

Figure 3:
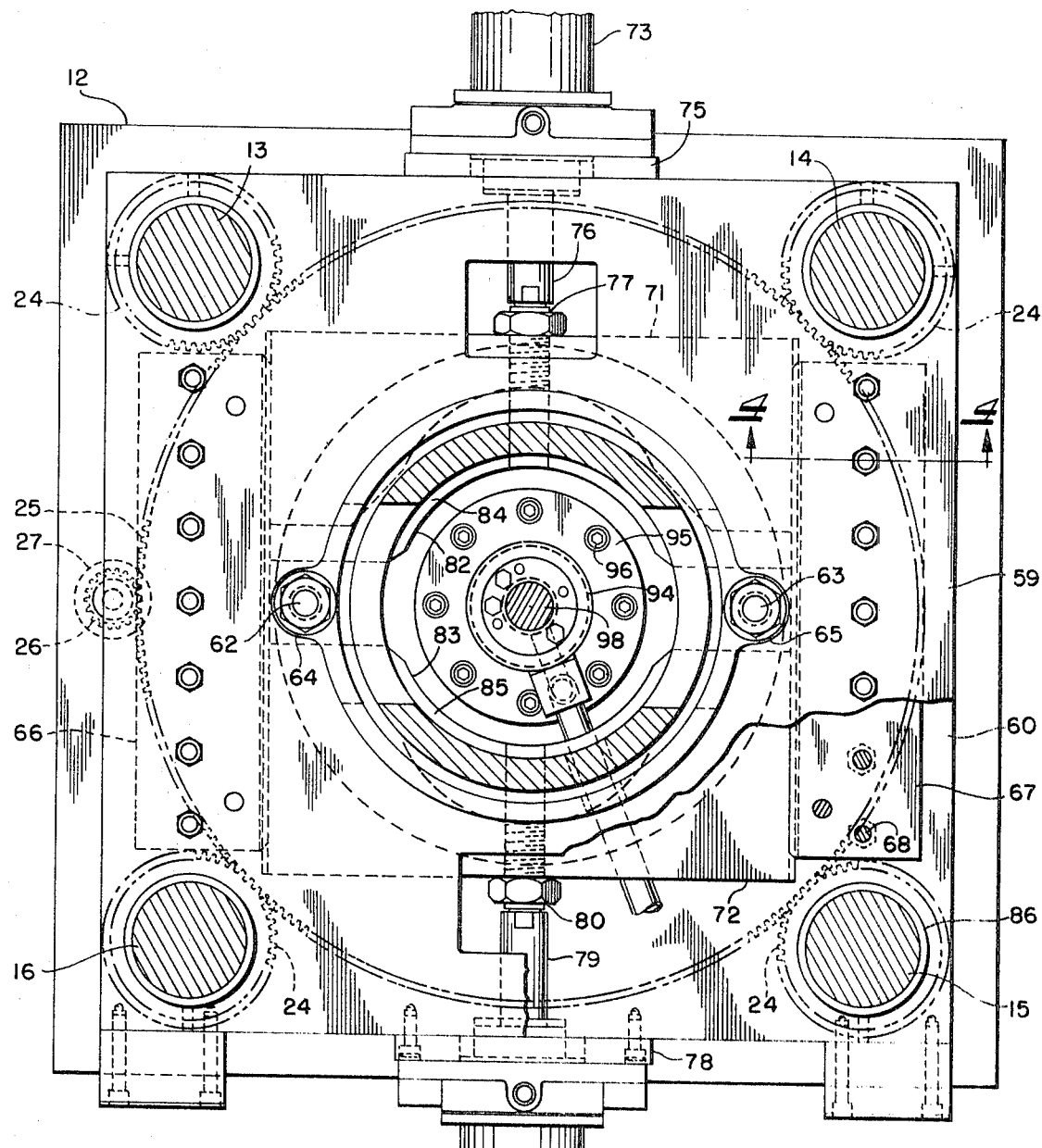
FIG. 3 is an enlarged vertical section of the machine taken substantially on the line 3—3 of FIG. 2.
Figure 4:
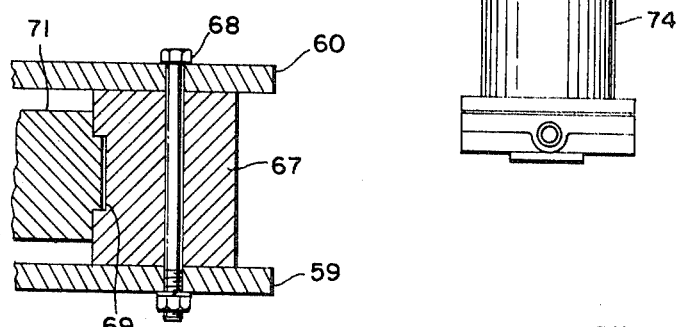
FIG. 4 is a detail of the mounting of the wedges taken substantially on the line 4—4 of FIG. 3.

As seen perhaps more clearly in FIG. 3, each of the wedges includes an arcuate central cut-out or recess as indicated at 82 and 83 for the wedges 71 and 72, respectively, and the faces of such wedges on the right hand side thereof as viewed in FIG. 2 includes wedge surfaces 84 and 85, respectively. These wedge surfaces may be of the same wedge angle as the wedge faces 54 and 55 on the end of the cylinder 51.

The tie rods 13 through 16 extend through bushings 86 in the plates 59 and 60 and also through similar bushings 87 in the movable die plate 11. In this manner, both the frame formed by the plates 59 and 60 as well as the movable die plate 11 may move along the tie rods.

Secured to the plate 60 is cylinder 88 having an I.D. slightly larger than the I.D. of the bushing 57. In this manner, the cylinder 51 may telescope within the cylinder 88. The cylinder 88 is provided with a wear cap 89 adjacent the wedges 71 and 72 when the latter are extended. Such cylinder may be provided with lateral bosses accommodating the fasteners 62 and 63.

The opposite end of the cylinder 88 is secured to large diameter piston 90, the cylinder 91 of which is formed in the front face of the end or back plate 12. The piston is retained within the cylinder by ring 92 held in place by suitable fasteners 93. The ring 92 also limits the stroke of the large piston 90, which in the illustrated embodiment may be approximately ¾ of an inch.

Extending through the center of the piston 90 as well as the back plate 12 is cylinder 94. Such cylinder is secured to the piston 90 by retaining ring 95 held to such piston by suitable fasteners 96. The cylinder 94 accommodates piston 97, the rod 98 of which is connected at 99 to the end 50 of cylinder 51 which is, of course, connected to the movable die platen 11.

The stroke of the piston-cylinder assembly 97, 94 may be adjusted from about 40 inches to about 16 inches through the adjustment 101. Rotation of the adjustment moves the blind end 102 of the cylinder axially within the cylinder to control the extent of the stroke of the piston.

The large piston-cylinder assembly 90, 91 may, for example, have a 30 inch bore or diameter and a ¾ inch stroke while the smaller piston-cylinder assembly 97, 94 may have a 6 inch bore and a 16 to 40 inch stroke.

Figure 5:
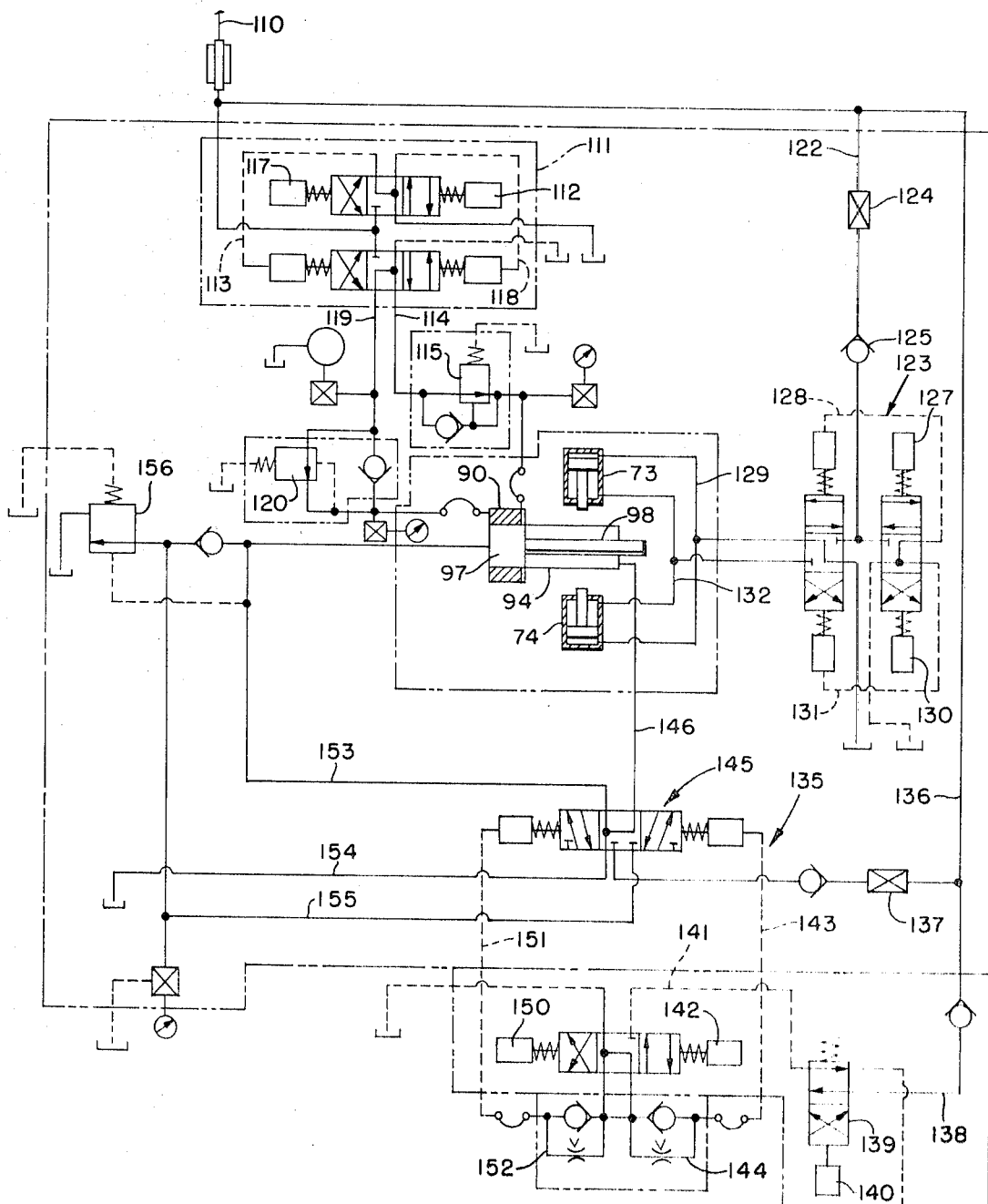
FIG. 5 is a schematic hydraulic diagram illustrating the operation of the various piston-cylinder assemblies of the clamp mechanism.

Referring now more particularly to FIG. 5, it will be seen that hydraulic fluid may be supplied from source 110 from a suitable dual volume and pressure pump unit to double solenoid pilot operated valve 111. When solenoid 112 is energized, the spool of its valve may be shifted to supply hydraulic fluid through pilot line 113 to conduct hydraulic fluid from the source to line 114 leading through pressure reducing valve 115 to the rod end of the large piston 90 to move the same to the left or to "open" position. If the solenoid 117 is energized, hydraulic fluid will be supplied to pilot line 118 supplying hydraulic fluid to line 119 and through pressure reducing valve 120 to the piston 90 to move the same to the right or to a "close" position. The pressure reducing valve 120 may be set to obtain the desired locking tonnage when the large piston 90 moves to the "close" position.

Branch line 122 also connected to the fluid pressure source 110 leads to double solenoid pilot operated valve 123 through needle valve 124 and check valve 125. The needle valve may be adjustable to obtain the desired in and out speed of the locking wedges through the operation of the piston-cylinder assemblies 73 and 74.

When solenoid 127 is energized, pilot line 128 will be pressurized to shift the spool of the valve to pressurize line 129 causing the pistons of both assemblies 73 and 74 to move inwardly.

When solenoid 130 is energized, pilot line 131 will be pressurized to connect the line 132 with the line 122 to cause the piston-cylinder assemblies 73 and 74 to retract or the wedges to move out.

The smaller piston-cylinder assembly 94, 97 is operated through the pilot valve shown generally at 135 through line 136. A needle valve 137 may be adjusted to control the "open" and "close" speed of the piston 97.

Pilot pressure for the valve 135 is obtained through line 138 by means of two position solenoid valve 139. The valve 139 energized by the solenoid 140 obtains an open cushion safety for the piston 97. When the solenoid 140 is energized, hydraulic pressure will be supplied to the line 141.

When solenoid 142 is energized, pilot line 143 will be pressurized through flow regulator 144. This shifts the directional valve 145 to supply hydraulic pressure to line 146 to retract the piston 97 or move it and thus the movable platen 11 to an "open" position as seen, for example, in phantom lines at 148 in FIG. 2. The extent of the opening is, of course, controlled by the adjustment of the end 102 of the cylinder.

When the solenoid 150 is energized, pilot line 151 is pressurized through flow control 152 shifting the valve 145 to supply hydraulic pressure to line 153 causing the piston 97 to move to a "close" position. In the center position of the valve 145, both lines 153 and 146 are connected to drain through line 154. However, during the closing operation, the line 146 may be connected to drain through line 155 which is connected to pressure control valve 156.

OPERATION

At the start of the cycle, with the machine in full "open" position, small piston 97 is in its full back position and the large piston 90 is in its full forward position.

To close the machine, hydraulic pressure is applied to the small piston 97 on the head end and the machine will close at maximum speed. At this time hydraulic pressure is being applied to the head end of piston 90 to hold it forward or in its "close" condition.

In the last few inches of travel of the piston 97, it is moving under restricted exhaust flow, or alternatively, a lower pressure. This may be accomplished by a solenoid valve, not shown, in the dual pump system.

While the piston 97 is still moving forward under the low pressure or restricted exhaust flow, the faces of the dies or molds 34 and 35 come together and the forward or closing travel of the piston 97 stops before completing its full stroke. There may be approximately ¼ inch of the stroke of such piston left.

The cylinder 51 will, of course, telescope out of the cylinder 88 and, of course, the bushing 57 to substantially the position shown in FIG. 2.

When the die halves have touched and the smaller piston 97 has stopped before the completion of its stroke, the pressure applied to the head end of the piston 90 is now transmitted to the rod end of such piston. Since the piston 90 is connected through the ring 95 to the cylinder 94, this pressure will move such cylinder backwards with the piston 90. This motion causes the piston 97 to complete its stroke, and opens cylinders 51 and 88 to permit insertion of the wedges.

As soon as the piston 97 reaches the end of its forward stroke, the wedges 71 and 72 are inserted locking the cylinder 51 to the cylinder 88 and thus to the piston 90. This forms a solid column between the piston 90 and the movable platen 11.

Pressure is now applied to the head end of the piston 90 to obtain the desired optimum clamping force. At this point, the injection cycle commences and the plastic or metallic material may be inserted into the mold by a suitable injection mechanism through the opening 160 seen in FIG. 2.

After the injection is complete, the pressure on the head end of the piston 90 is relieved and pressure is applied to the rod end of the piston 90 moving it backwards or to an "open" position thereby breaking open the die. Only until this is done can the wedges be withdrawn.

After the wedges are withdrawn, pressure is then applied to the rod end of piston 97 and the cylinder 51 then telescopes within the cylinder 88 and the machine opens with the movable platen moving to the position 148 seen in FIG. 2. After ejection and with the piston 97 at the end of its "open" stroke, the cycle is completed.

It can now be seen that there is provided a machine having a full hydraulic clamp in which the inner cylinder 51 connected to the movable platen 11 drives forward at full speed. At the end of its stroke, the shear blocks or wedges mechanically connect the inner cylinder with the outer cylinder to form a continuous solid column between the movable platen and the piston 90 in the end plate 12. Pressure applied to the large diameter face of the piston 90 then obtains the full rated clamping tonnage.

Other modes of applying the principles of the invention may be employed, change being made as regards the details described, provided the features stated in any of the following claims or the equivalent of such be employed.

I, therefore, particularly point out and distinctly claim as my invention:

1. An injection molding machine including a fixed and movable platen, a large clamp piston-cylinder assembly, a smaller piston-cylinder assembly connected to said movable platen operative to open and close the same, a first cylinder mounted on said large piston, a second cylinder connected to said movable platen and telescope with respect to said first cylinder, lock means operative rigidly to connect said cylinders when said movable platen is closed thereby mechanically interconnecting said large clamp piston-cylinder assembly to said movable platen, and means operative to pressurize said clamp piston-cylinder assembly to obtain the required clamping tonnage on said movable platen.

2. A machine as set forth in claim 1 including a fixed end plate adjustably connected to said fixed platen, the cylinder of said clamp piston-cylinder assembly being provided on the inner face of said end plate.

3. A machine as set forth in claim 1 wherein the piston of said clamp piston-cylinder assembly is connected to the cylinder of said smaller piston-cylinder assembly.

4. A machine as set forth in claim 1 wherein the cylinder of the smaller piston-cylinder assembly extends axially through the piston of the clamp piston-cylinder assembly.

5. A machine as set forth in claim 1 wherein said lock means includes diametrically opposed wedges and piston-cylinder means operative to extend and retract said wedges.

6. A machine as set forth in claim 1 wherein the stroke of said smaller piston-cylinder assembly is slightly longer than required to close said movable platen.

7. A machine as set forth in claim 6 including means operative to extend said clamp piston-cylinder assembly as said smaller piston-cylinder assembly moves said movable platen to a closed position.

8. A machine as set forth in claim 7 including means operative to retract said clamp piston-cylinder assembly before said lock means are operative to connect said cylinders, retraction of said clamp piston-cylinder assembly completing the stroke of said smaller piston-cylinder assembly.

9. A machine as set forth in claim 1 including a guide bushing on the end of said first cylinder operative to maintain said second cylinder in axial telescoping relation with said first cylinder.

10. A machine as set forth in claim 9 including a frame on the end of said first cylinder accommodating said lock means for movement to an operative position behind said second cylinder.

11. A machine as set forth in claim 1 wherein said lock means are mounted on a parallel plate frame for movement in opposed diametrical fashion, said frame being mounted on said first cylinder.

References Cited

UNITED STATES PATENTS

| | | | |
|---|---|---|---|
| 2,689,978 | 9/1954 | Roger | 18—30 |
| 3,156,014 | 11/1964 | Wenger | 18—30 |
| 2,807,050 | 9/1957 | Roger | 18—30 |
| 3,263,277 | 8/1966 | Ohlendorf | 18—30 |
| 2,618,823 | 11/1952 | Perkon | 18—30 |

FOREIGN PATENTS 1,180,494   6/1959   France.

CHARLES W. LANHAM, Primary Examiner

R. M. ROGERS, Assistant Examiner

U.S. CL. X.R.

18—30LA